(No Model.)
W. CASE.
NUT LOCK.
No. 550,905.  Patented Dec. 3, 1895.
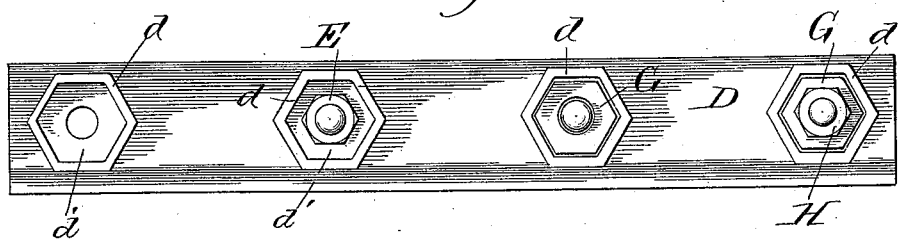
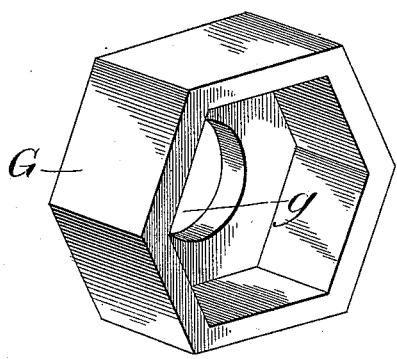
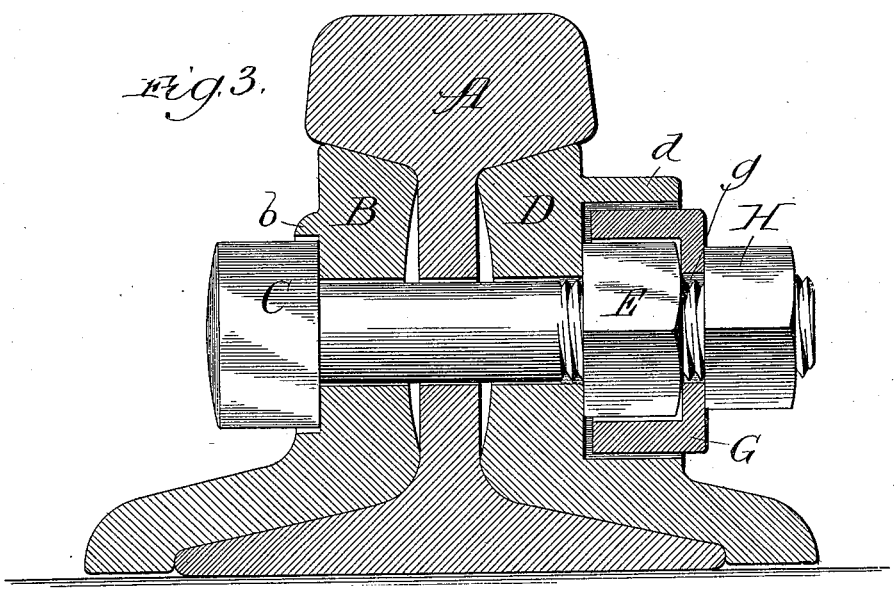
Witnesses:
Chas E Gaylord
Lute J Alt
Inventor:
William Case,
By Banning & Banning & Sheridan,
Attys

UNITED STATES PATENT OFFICE.

WILLIAM CASE, OF CHICAGO, ILLINOIS, ASSIGNOR TO THE NATIONAL MALLEABLE CASTINGS COMPANY, OF CLEVELAND, OHIO.

NUT-LOCK.

SPECIFICATION forming part of Letters Patent No. 550,905, dated December 3, 1895.

Application filed February 5, 1895. Serial No. 537,356. (No model.)

*To all whom it may concern:*

Be it known that I, WILLIAM CASE, a citizen of the United States, residing at Chicago, Cook county, Illinois, have invented certain new and useful Improvements in Nut-Locks, of which the following is a specification.

The object of my invention is to provide a simple, economical, and efficient nut-lock, which may be used in connection with railroad-rails, machinery, bridge structures, &c.; and the invention consists in the features and combinations hereinafter described and claimed.

In the accompanying drawings, Figure 1 is a side elevation of a fish-plate such as used in connecting rails together, with my improvement attached thereto; Fig. 2, a perspective view of the locking-ring, looking at its interior chamber; and Fig. 3, a transverse sectional elevation showing the rail, fish-plate, bolts, and lock-nuts in operative position.

I have shown my improvement as it is adapted to be used in connection with fish-plates for connecting railroad-rails together;
but I do not desire to be limited to this use, as, with slight modifications, it may be used with the body portions of cars, machinery, or bridge structures, and in various other places. For the sake of simplicity, and to avoid multiplicity of claims, drawings, &c., I have chosen to illustrate it in connection with a fish-plate.

In using my improvement for connecting railroad-rails A together I use a fish-plate B on one side of the rails, provided with recesses $b$, adapted to receive the head of a bolt C and prevent it from turning. On the opposite side of the rails I use a second fish-plate D, preferably provided with a number of projecting bosses $d$, having irregular-shaped recesses $d'$, preferably in the shape of a hexagon, although the shape is not material, as will be hereinafter described. To securely hold the bolts in their locking position I prefer to provide hexagonal locking-nuts E, which normally serve to hold the several parts together. Surrounding these nuts, and to hold them firmly in their locked position, I provide what I term a "locking-ring" G, which, in this instance, is preferably made cup-shaped, but is provided with an axial opening $g$, through which the bolt may be inserted. This locking-ring is inverted, so that it surrounds the locking-nut, and its external periphery is of the same configuration as the irregular recess of the fish-plate into which it is inserted when it surrounds the locking-nut to prevent it from turning. The central recess of the locking-ring is of the shape and size of the inner locking-nut, so that when such nut is drawn to its tightest position, as shown in Fig. 3, the locking-ring is slid over into the recess, thus preventing the turning of such nut until the locking-ring has been removed. Engaging with the threaded portion of the bolt and with the exterior of the locking-ring are outer jam-nuts H, which are screwed firmly down into position to contact the locking-ring and prevent its removal. It will be seen that these jam-nuts do not take any of the strains to which the rails and fish-plates of the cars are subjected, and merely act to hold the locking-ring in position.

In Fig. 1 I show the irregular recess of the fish-plate left free from all mechanism. In the second recess I merely show the bolt and locking-nut. In the third recess the locking-ring is applied over the locking-nut, while to the right of Fig. 1 I have shown all the parts in their position.

The advantages of my improvements are that I have provided simple, economical, and efficient means for holding the locking-nuts in place, in that the jam-nut must become entirely disengaged from the bolt before the locking-ring can be withdrawn sufficiently to allow the locking-nut to become at all loosened.

While I have described my invention with more or less minuteness as regards details, I do not desire to be limited thereto unduly, any more than is pointed out in the claims. On the contrary, I contemplate all proper uses, changes in form, construction, and arrangement, the omission of parts and substitution of equivalents, as circumstances may suggest or render expedient.

I claim—

1. In a nut lock, the combination of a body portion provided with an irregular recess adapted to receive a locking ring, a bolt or similar part, means to prevent the bolt from turning, a locking nut on such bolt, a locking ring surrounding the locking nut and provided with an irregular periphery adapted to enter the irregular recess in a body portion and prevent its rotary displacement, and a jam nut on the bolt exterior to the locking ring to prevent longitudinal displacement of such ring, substantially as described.

2. In a nut lock for railroads, the combination of a fish plate or plates adapted to connect rails together, at least one of such plates being provided with an irregular recess to receive a locking ring, a bolt passed through the fish plate or plates, a lock nut on the bolt to hold the parts together, a locking ring surrounding such locking nut provided with an irregular periphery and inserted in the irregular recess of the fish plate to prevent its turning, and a jam nut on the bolt exterior to the locking ring to prevent longitudinal displacement of such ring, substantially as described.

WILLIAM CASE.

Witnesses:
EPHRAIM BANNING,
THOMAS B. MCGREGOR.